(12) United States Patent
Nelson

(10) Patent No.: US 6,300,870 B1
(45) Date of Patent: Oct. 9, 2001

(54) AUTOMOTIVE DIGITAL REAR WINDOW DISPLAY UNIT

(75) Inventor: Warren Fred Nelson, St. Paul, MN (US)

(73) Assignee: Warren F. Nelson, St. Paul, MN (US)

( * ) Notice: Subject to any disclaimer, the term of this patent is extended or adjusted under 35 U.S.C. 154(b) by 0 days.

(21) Appl. No.: 09/411,670

(22) Filed: Oct. 4, 1999

(51) Int. Cl.$^7$ ................................................ B60Q 1/26
(52) U.S. Cl. ..................... 340/468; 340/463; 340/464; 340/469; 340/471; 340/472
(58) Field of Search ................................ 340/468, 472, 340/473, 470, 463, 469, 464

(56) References Cited

U.S. PATENT DOCUMENTS

| | | | |
|---|---|---|---|
| 4,361,828 | * 11/1982 | Hose | 340/107 |
| 4,868,542 | * 9/1989 | Thompson | 340/468 |
| 4,928,084 | * 5/1990 | Reiser | 340/479 |
| 5,053,746 | * 10/1991 | Taneo | 340/473 |
| 5,574,428 | * 11/1996 | Groover | 340/468 |
| 5,825,281 | * 10/1998 | McCreary | 340/425.5 |
| 5,905,434 | * 5/1999 | Steffan et al. | 340/464 |

* cited by examiner

Primary Examiner—Jeffery Hofsass
Assistant Examiner—Son Tang

(57) ABSTRACT

A complex vehicle communicating system consisting of a onboard microelectronic miniature computer unit installed in the interior of a vehicle and a light emitting polymer (LEP) display panel unit located on the interior of the vehicle rear window. The Automotive Digital Rear Window Display (ADRWD) panel has a data connection input from the Automotive Digital Rear Window Display Unit onboard computer, and a direct data contact from the vehicle's microelectronic main computer. The vehicle operator who's driving the vehicle controls the ADRWD unit computer. It contains a selection of electronic computerized preprogrammed memory insert chips which displays messages that can be selected by the driver. The driver of the vehicle selects a message and commands the computer to transmit the data to the ADRWD unit array display panel. Commands from the vehicle main computer operate in conjunction with the ADRWD unit in regard to current conventional types of signaling devices now equipped on vehicles. The unit's digital mode selection console allows the viewer to view multiple choices of selections all at once. Each selection is controlled by a group of buttons designated for each field on the unit's digital LCD console mode selection display. When the selection is made, the message becomes highlighted. The selected command is transmitted by electronic circuitry connection to the LEP display panel in the rear of the vehicle by pressing "one" button. To disconnect command, the driver presses the button again wherein the highlighted selection on the ADRWD unit's console and LEP display message disengages.

11 Claims, 12 Drawing Sheets

AUTOMOTIVE DIGITAL REAR WINDOW DISPLAY -UNIT

AUTOMOTIVE DIGITAL REAR WINDOW DISPLAY-UNIT

AUTOMOTIVE DIGITAL REAR WINDOW DISPLAY-UNIT

AUTOMOTIVE DIGITAL REAR WINDOW DISPLAY UNIT

AUTOMOTIVE DIGITAL REAR WINDOW DISPLAY-UNIT

AUTOMOTIVE DIGITAL REAR WINDOW DISPLAY UNIT

AUTOMOTIVE DIGITAL REAR WINDOW DISPLAY-UNIT

AUTOMOTIVE DIGITAL REAR WINDOW DISPLAY UNIT

AUTOMOTIVE DIGITAL REAR WINDOW DISPLAY-UNIT CONTROL PAD

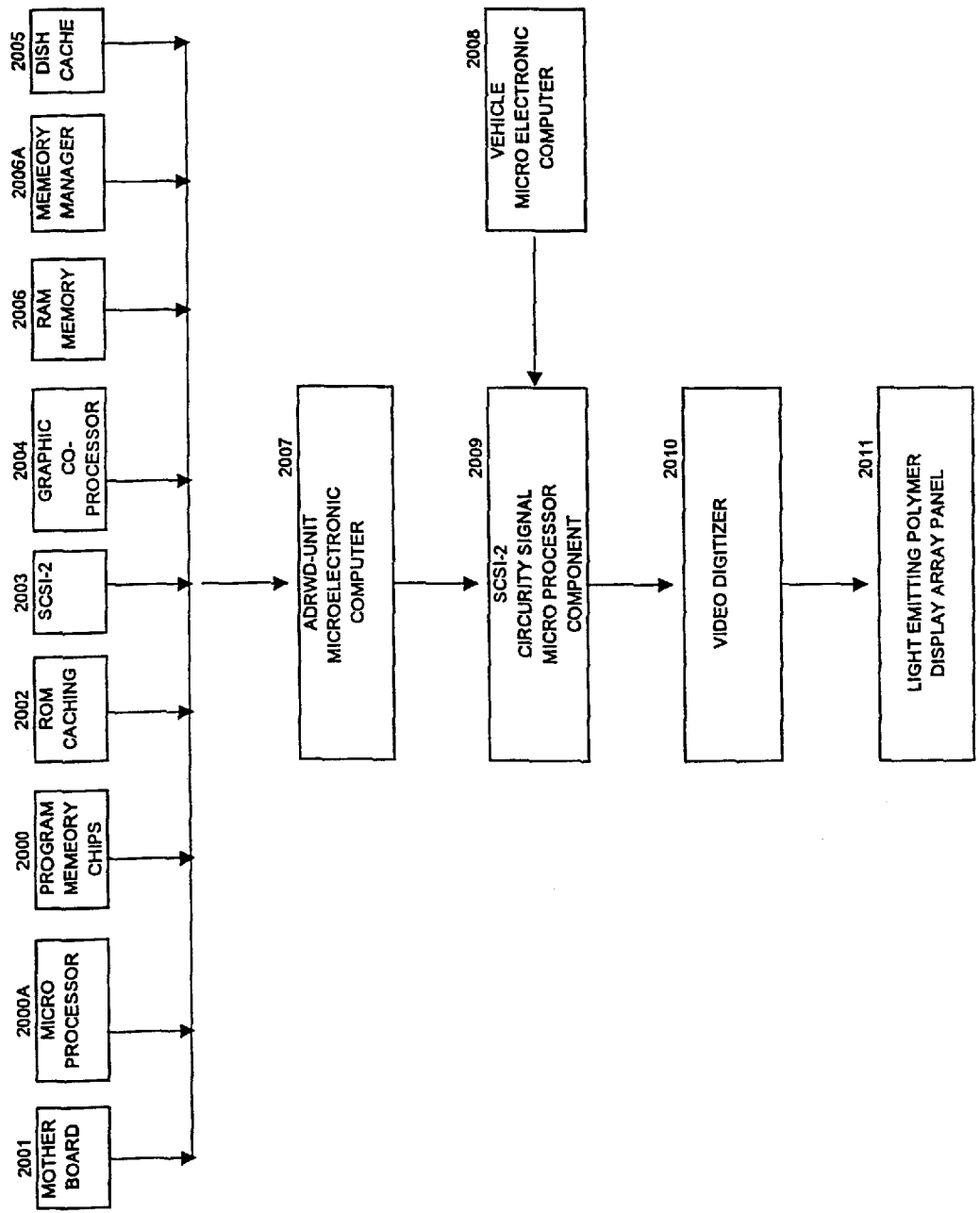

AUTOMOTIVE DIGITAL REAR WINDOW DISPLAY UNIT

BACKGROUND OF THE INVENTION

1. Field of the Invention

The Automotive Digital Rear Window Display Unit relates to a digitized information base system installed in the compartment of a vehicle. This invention relates commonly to a communication system installed in a vehicle to communicate intentions to drivers of other vehicles in the rear, or at an angle from the car in front. Unequivocally this invention relates to a interactive system installed in a vehicle in which communicates information concerning situations, and conditions the drivers of other vehicles will encounter. The invention also relates to a communication system installed in a vehicle to communicate various other types of information to other drivers 2. Discussion of the Related Art In 1995, there were 2,287,000 Rear End accidents. 1,966,560 Left Angle Accidents, and 1,919,850 right Angle Accidents. More fatal accidents occurred on Saturday than any other day of the week in 1995, according to reports from state traffic authorities. More than 18% of fatal accidents occurred on Saturday, compare to 12% on Wednesday. For all accidents, Friday had the highest percentage with more than 17% Patterns by hour of day for fatal accident show peaks, during afternoon rush hour for weekdays, especially, late night for weekends, for both types of accidents, peaks occur during both morning and afternoon rush hour. In all there were 6,710 on Sunday, 5,170 on Monday, 4,930 on Tuesday, 4,890 Wednesday, 5,340 on Thursday, 6,860 on Friday, and 7,800 on Saturday, with a combined total of 41,700 fatal accidents. (Source: U.S. Department of Transportation Accident facts 1996 edition.)

In 1996, while collisions between motor vehicles accounted for less than half of motor vehicle fatalities, this accident type represented over 70% of injuries, injury accidents, and all accidents. Of collisions between motor vehicles, ANGLE COLLISION and REAR END COLLISIONS caused the greatest number of deaths. In 1996, Motor Vehicle ANGLE COLLISIONS caused 8,500 Deaths, 886,000 nonfatal accidents, 7,000 Fatal Accidents, 505,000 Injury Accidents, and 3,060,000 in all vehicle Angle Collision accidents. In 1996, Motor Vehicle REAR COLLISIONS caused 2,000 Deaths, 676,000 Nonfatal Accidents, 1,700 Fatal Accidents, 385,000 Injury Accidents, and 2,550,000 in all vehicle Rear End Collision accidents. (Source: U.S. Department of Transportation Accident facts 1997 edition.)

In 1997 motor vehicles deaths occur more often in collisions between motor vehicles than any other type of accident. This type represents about 49% of the total of accidents in all instances. While collisions between motor vehicles accounted for less than half of motor-vehicle fatalities, this accident type represented 77% of injuries, 71% of injury accidents, and 71% of all accidents. Of collisions between motor vehicles, ANGLE AND REAR END COLLISIONS cause the greatest number of deaths, and the greatest number of nonfatal injuries as well as fatal, injury, and all accidents. In 1997, ANGLE COLLISIONS caused about 10,800 Deaths, 938,000 Nonfatal injuries, 8,500 Fatal Accidents, 567,000 Injury Accidents, and a total of 4,970,000 angle collisions in all accidents, in 1997. In 1997, REAR-END COLLISION caused 2,500 Deaths, 723,000 Nonfatal Injuries, 2,000 Fatal accidents, 437,000 Injury Accidents, and 3,910,000 rear end collisions in all accidents in 1997. (Source: U.S. Department of Transportation Accident facts 1998 edition.)

In 1995 there was a estimated total 2,287,000 motor vehicle accidents; in 1996 there was a estimated total of 2,550,000 motor vehicle accidents; and in 1997, there was a estimated total of 3,910,000 rear end motor vehicle accidents. Statistics pertaining to motor vehicle accidents concerning Rear End, and Angle collisions are increasing, not declining. In 1994, and 1995 there were registration of almost 200,000,000 vehicles per year. In 1996, there were 177,800,000 licensed drivers, and registrations soared to more than 209,000,000 million. (Source: U.S. Department of Transportation Accident facts.)

Though this device does not prevent the actual accident from happening, It provides broader awareness during operation of motor vehicles. Current conventional rear light displays help, but are not effective, because the average driver has become accustomed, and therefore attention span is relaxed in their everyday driving. This new technology enhances conscious awareness, and perception, which is desperately needed in reducing angle and rear end collision annual statistics. Interviews with drivers involved in rear end collisions all noted that the reason the collisions occurred, was due to driving too close, not paying attention due to relaxation, alertness, or simply didn't notice that the driver in front was slowing or stopping. Example: when a driver is driving toward the sun, and the sun's glare makes it impossible to tell if the brake lights on the car in front is in operation. It is estimated that this device will drastically reduce rear end collisions by 50% in all circumstances involving Rear End Collisions, and 25% in Angle Collisions. With these statistics increasing every year due to automobile production, more comprehensive technology is needed in making driving safer for both adults, and children.

Various methods invented for vehicle to vehicle communicating devices have been submitted. Commonly, these devices involved the signaling of pre-selected messages from one vehicle to another by operation of a switch to select the message to be communicated. These methods do not interface with the standard vehicle signaling devices. Communicating devices also include permanent signals with messages that are displayed on the vehicle. Proposed methods include messages that are pre-programmable. System problems occur when these unchanging signals are displayed, and could cause possible conflicts in messages that might represent misinterpret signals, opposite of what user intends to transmit. There can be confusing messages sent by the device to the drivers of other vehicles when the automatic signals are displayed, pertaining to current conventional signal lights. For example, the driver of a vehicle may be displaying a fixed signal such as merging left lane, when an emergency braking situation occurs. Other methods include using the brakes to transmit information, this is clearly a danger to other drivers in vehicles because brake lights are intended to inform vehicles of slowing and/or stopping, and should remain for just that purpose. In such a instance a driver presses the break pedal and does not have time to remove the current displayed message. These types of devices clearly have real potential to cause accidents.

Another device proposed is a remote control unit pre-programmable by user. This remote device has a table of pre-selected and programmed messages. A rotary switch to scroll through the messages, and a switch to select the desired messages. The rotary device can be pre-programmed by a program installed on a hand held computer with a cable attached from the hand held computer to the remote unit.

The rotary selector switch causes the memory unit to scroll through the selections in the table. As the rotary selector switch points to a message in the table the message is displayed on the driver interface panel. Rotating the rotary selector switch in either direction causes the pattern generating module in the remote control unit to sequence up or down through the pre-set display patterns. To choose the flashing pattern, the rotary selector switch is pushed inwardly, or clicked. Further the remote causes message to scroll if the message is longer than the width of the display unit. And finally, the device has a radio frequency signal encoder and wherein the communication module includes a radio frequency transmitter to transmit an encoded radio frequency signal to the display unit, wherein the communication module to receive the identification code from the remote control unit comprises a radio frequency signal receiver and a radio frequency signal decoder.

In current driving situations, a driver must make clear his or her intentions in a matter of spit seconds. In regards to the rotary device, one must first place the right hand on the rotary selector switch, and turn to sequence up or down through the pre-set display patterns, and search for the desired messages in either direction while still maintaining control of the vehicle. Once message has been located, driver must then push the rotary sector switch inwardly, or clicked, which causes the information concerning the pattern to be sent to the RF sending unit. As stipulated, drivers of vehicles have only spit moments to set forth their intentions to drivers in the rear. To avoid accidents, one must have his/her attention focused on the surrounding traffic, and should not be presented with having to look back and forth from, and to traffic numerous times at a interface panel which only provides one option to be viewed at a time which requires more attention, and thus, placing occupants in possible jeopardy of being involved in a accident. Radio Frequency signals represent new technology, but is not a reliable source in this day and age when there are millions of countless imprints of microwave signals bouncing off satellites, and antennas. Radio Frequencies have a tendency to fade, or phase out, unless one is equipped with state of the art, solid state components such as the military possesses and use on their smartbombs. These devices are controlled by laser guided radio frequencies which cost up to tens of thousand of dollars to create, and still does not posses a 100% accuracy transmittal rate. For example, cell phones use satellites, and antennas to connect, and communicate information. Cell phones do not measure up to, or equal with reliability compared to wire telephones from offices or homes, because the signals have a tendency to break up if the telecommunication satellite is not in range. Another example, is unclear reception regarding radio stations on a car radio, when radio stations do not come in clearly, this is because radio air wave frequencies are not transmitting clear signals due to interference, therefore radio frequencies are unreliable. Access by users to pre-program what messages are displayed, pose a critical problem, because obscenities can be programmed onto display which could possibly cause road rage, or confusing information by unskilled programmers. Pre-programmed information should be implemented by skilled professionals who have researched, evaluated, and have analyzed all possible driving scenarios which apply to driving situations. Preferably, skilled professionals from a vehicle manufacturer whose main responsibility has already been instituted in providing safety to occupants in their vehicles. The ADRWD Unit's pre-programmed memory insert chips are programmed by manufacturer, and cannot be altered, or modified except by manufacturer. Manufacturer will program all possible driving situations, conditions, and environment selections onto program chips.

Previous display methods propose using LCD displays, or liquid crystal display panels, and this is new technology, but LCD's have a tendency to lose integrity because they cannot be exposed to abnormal high temperatures or direct sun contact for long periods of time. LCD's are packaged by using two sheets of glass with various coating, and liquid extracted chemicals placed in between the two sheets of glass. When these chemicals are heated, or exposed to heat, they tend to boil, and lose integrity. In addition, proposed method also indicates that message would be scrolled if the message is longer than the width of the display unit, this also poses a problem, because drivers in the rear do not have the time to fix their eyes on the complete message that is scrolling when their attention is focused on the road, therefore this proposed method has a potential to cause a accident.

The existing invention proposes a Light Emitting Polymer (LEP) display panel. The features and benefits of LEP technology that makes it applicable for wide range of display applications are flexible substrates, large area coating, no backlights required, no colour filters, no aperture loss, 180 degree viewing angle, very high resolution, any pixel shape and size possible, easy manufacturing integration with electronic components, ruggedness, allows use of polarisers to give high contrast. The display is driven by passive multiplexing being solid state the display is a very thin glass, which requires only one sheet of glass, instead of two sheets of glasses needed for LCD's, and because it is self-emissive, it shows a very wide viewing angle. Simple additions to the device structure make LEP devices legible under conditions of high ambient light, such as sunlight even if they are working at low output. And finally, Light Emitting Polymer displays are packaged in any size, whereas only one panel is needed which would cover the entire width of the vehicle window, whereas in the previous method, 2 to 16 panels are required.

The previous existing systems, as well as proposed systems, do not have the capability to provide reliability, accuracy, and speed where seconds count.

Henceforth, what is needed is a digitized communication system that increases the amount of information with accuracy, and spit second speed with pre-programmed digital memory insert chips programmed by individuals skilled in the art of highway situations, and scenarios, and most importunately, uncomplicated selections with ample simplicity.

SUMMARY OF THE INVENTION

The Automotive Digital Rear Window Display Unit is a device, which is designed to prevent vehicle rear end, and angle collisions between automobiles. The display unit is installed on the inside of the windshield of the vehicle. (Properties-micro electronic computerized control pad, and light emitting polymer display). The Automotive Digital Rear Window Display Unit is a digitized view display operated by microelectronic program memory chips (hard drive) which are operated from a computerized control pad within the compartment (car). The purpose of the display is to communicate to vehicles in the rear, the intentions of the driver in front within spit seconds of decision, and selection. The display projects awareness, and alertness to traffic in the rear. The ADRWD-Unit provides extraordinary advantages. For instance, if a driver was in need of medical help, and unable to drive, in most instances the occupant would have no way to get help from other drivers passing by, unless they tried to flag, or stop them. With the ADRWD-Unit, the incapacitated driver can communicate the problem, or situation to other drivers, or law enforcement at a fingers touch, by pressing the-emergency, or call 911 selection button. The Automotive Digital Rear Window Display Unit-Control Pad enables user to select text that identifies with the driving situation. It notifies vehicles in the rear, if the driver wishes to switch lanes, merge left, or right traffic lanes, type of passengers on board, speed limit notification to drivers in the rear approaching too fast, driving too close, engine or car trouble, icy road conditions, etc., e.g,. The purpose of the current tail light and conventional turning signal is to communicate to the driver in the rear the intentions of the driver in front of him/her. Unfortunately, they'll not reducing rear end, and angle collisions. The Automotive Digital Rear Window Display Unit enhances attentiveness, consciousness, perception, comprehension, and observance. Each year the rate of Rear End, and Angle collision fatalities rise, and the automotive industries have not progressed in reducing these statistics.

A Automotive Digital Rear Window Display Unit system disposed in a vehicle, consisting of a solid state microelectronics infrastructure computer unit which is installed in a vehicle, wherein the Automotive Digital Rear Window Display Unit includes a power button which turns the ADRWD power unit on, a light intensity button which provides up to three levels of visual intensity, and depth, a size control button which provides four different size effects, a set of selection function buttons which user has the ability to select the type of display one desires, depending on the driving situation one is surrounded by, a invert rear display button, which changes the background red and the foreground black, or vise versa. The ADRWD Unit has a set of preprogrammed memory program insert chips which translate preprogrammed digital information to the rear display, a activated program chip indicator, which allows user to distinguished which chip is currently in use, a set of program chip selection buttons which selects the type of driving program user wishes activated, a digital mode selection indicator which provides a list of selections are available on the activated program insert chip, a activated selection highlight indicator function, two standard turning signal buttons which displays an arrow if turning left, or right. A blinking hazard/beacon light button which when pressed it sends a low level electrical current to the display, a stop function button, which stops all commands. A interface with Mfg.'s automotive microelectronic main computer having a transmittal electronic circuitry signal component processor from which current conventional lighting signals on automobiles are allocated certain degrees of singular sets of precedence over the ADRWD Unit commands.

A flat panel light emitting polymer display positioned on the inside of the compartment of a vehicle, in which display screen expands the full length of the windshield for optimum distinction, and visualization whereas display unit includes a micro processing component to acquire the correct priority command method from both the ADRWD computer, and the vehicle main micro computer, whereas display includes a video digitizer to enhance display resolution and a scanning frequency from one corner of the display to the opposite corner, to a refresh rate of –0 to 75 hertz. A digital component system whereas display is relayed commands from a microelectronics computer through electronically component circuitry connections. An automotive main computer having a transmittal electronic circuitry signal component processor from which current conventional lighting signals on automobiles are allocated certain degrees of singular sets of precedence over the ADRWD Unit commands. ADRWD Unit comprises a microelectronic motherboard in which the other components are supported, including zero insertion force sockets (ZIP) and peripheral expansion slots. ADRWD Unit comprises a ROM caching and memory swapping wherein memory manager commands execute from faster memory. ADRWD Unit comprises a small computer system interface (SCSI-2) whereas SCSI-2 specification calls for the drive, not the host logistics, to have most of the intelligence when processing the data. ADRWD Unit comprises programmable accelerators called graphic coprocessors which are programmed to specific types of tasks ADRWD Unit comprises a disk cache whereas the disk cache is a protected area in the control pad's RAM in which when the ADRWD Unit is fired up it requests data from the preprogrammed insert chips and creates a copy of that data and then placed in the disk cache. ADRWD Unit comprises of a flat panel light emitting polymer display positioned on the inside of the compartment of a vehicle, in which display screen expands the full length of the windshield for optimum distinction, whereas display unit includes a micro processing component to acquire the correct priority command method from both the ADRWD computer, and the vehicle main micro computer, whereas display includes a video digitizer to enhance display resolution at a scanning frequency from one corner of the display to the opposite corner, to a refresh rate of –0 to 75 hertz. ADRWD Unit uses electronic circuitry connections from the ADRWD microelectronic computer directly or via manufacturer's vehicle computer to the LEP flat panel display, and dose not use radio frequencies. The design and concept of the ADRWD-Unit is the essential aspect of the device, and is a well suited new technology for the $21^{st}$ Century automotive industry.

BRIEF DESCRIPTION OF THE DRAWINGS

The device facial traits believed nature of the invention are asserted in the attached claims. The invention itself, however, as well a preferred method of use., and further objects and improvements., therefore, will best be comprehend by allusion to the following, specified description of figurative embodiments when read in association with the accompanying drawings, wherein:

FIG. 13 Is a block diagram of the Automotive Digital Rear Window Display Unit.

DETAILED DESCRIPTION

Figure 1:
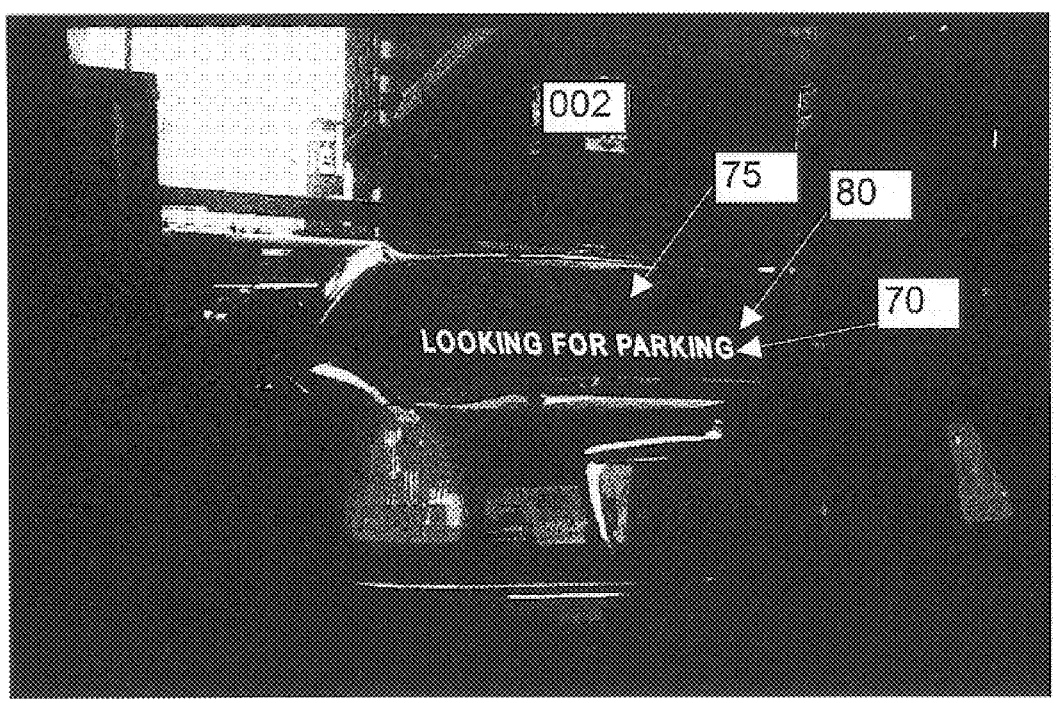
FIG. 1 represent a vehicle with an ADRWD Unit display in parallelism with the current invention arranged inside the rear window of the vehicle. The display is shown portraying the message "LOOKING FOR PARKING"

FIG. 1 represent a vehicle with an ADRWD Unit display 80 in parallelism with the current invention arranged inside the rear window 75 of the vehicle 002. The display is shown portraying the message "LOOKING FOR PARKING" 70. Here the ADRWD-Unit display indicates to drivers in the rear of the driver's intent to find parking, which is very useful when drivers in the rear are wondering why your slowing down.

Figure 2:
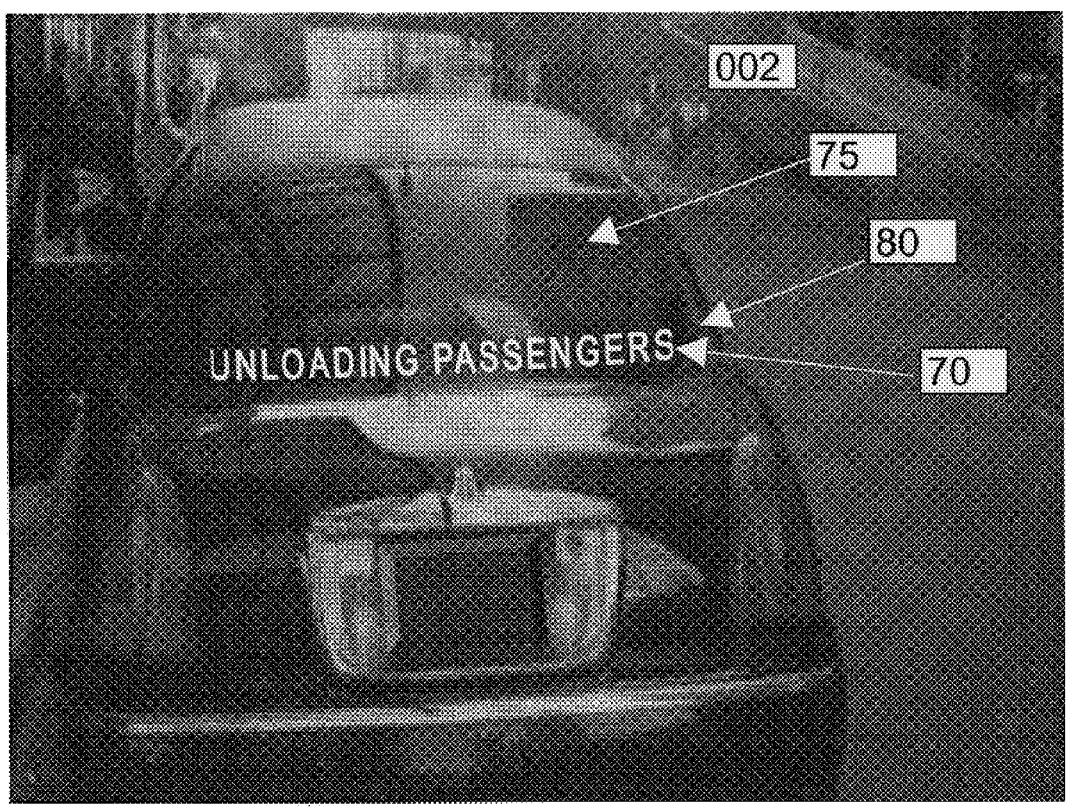
FIG. 2 represent a vehicle with an ADRWD Unit display in parallelism with the current invention arranged inside the rear window of the vehicle. The display is shown portraying the message "UNLOADING PASSENGERS".

FIG. 2 represent a vehicle with an ADRWD Unit display 80 in parallelism with the current invention arranged inside the rear window 75 of the vehicle 002. The display is shown portraying the message "UNLOADING PASSENGERS" 70. This illustration represents the affects the ADRWD-Unit Display, display's "Unloading Passengers". This selection communicates directly to approaching traffic that the vehicle is unloading occupants in a no parking zone. Greatly useful if one wishes traffic in the rear to approach with caution as they pass the vehicle. (as symbolized in the illustration, extremely useful for limo services, or airport taxi cabs)

Figure 3:
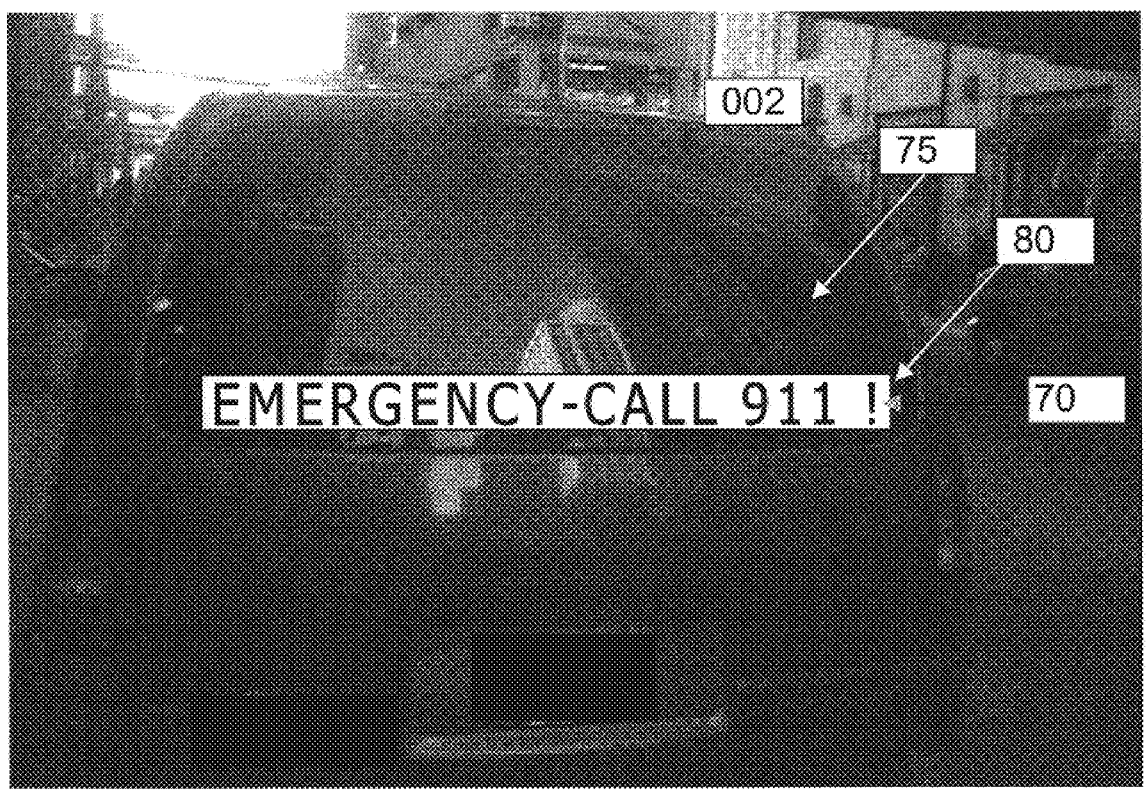
FIG. 3 represent a vehicle with an ADRWD Unit display in parallelism with the current invention arranged inside the rear window of the vehicle. The display is shown portraying the message "EMERGENCY-CALL 911!"

FIG. 3 represent a vehicle with an ADRWD Unit display 80 in parallelism with the current invention arranged inside the rear window 75 of the vehicle 002. The display is shown portraying the message "EMERGENCY-CALL 911!" 70. Here the ADRWD-Unit illustrates a very extraordinary feature. If for some reason, occupant(s) of vehicle require immediate assistance, or help, the emergency selection mode can be activated to communicate to approaching traffic in the rear that is it imperative that someone assists. (The "Emergency-Call 911" selection should only be used in medical life and death situations only!

Figure 4:
FIG. 4 represent a vehicle with an ADRWD Unit display in parallelism with the current invention arranged inside the rear window of the vehicle. The display is shown portraying the right turn arrow message. This illustration represents the affects the ADRWD-Unit Display exhibits when the STANDARD TURNING SIGNAL is engaged under normal display mode.

FIG. 4 represent a vehicle with an ADRWD Unit display 80 in parallelism with the current invention arranged inside the rear window 75 of the vehicle 002. The display is shown portraying the right turn arrow message. This illustration represents the affects the ADRWD-Unit Display exhibits when the STANDARD TURNING SIGNAL 70 is engaged under normal display mode. It is illustrated to exhibit the visual effect it presents to approaching traffic in rear. In addition communicates the exact intentions, which is to turn right as illustrated. In addition, this is a automatic response when tuning by either using the conventional turning switch, or by using the selection on the ADRWD-Unit Control Pad. Both the Display and the conventional rear-turning signal initiates.

Figure 5:
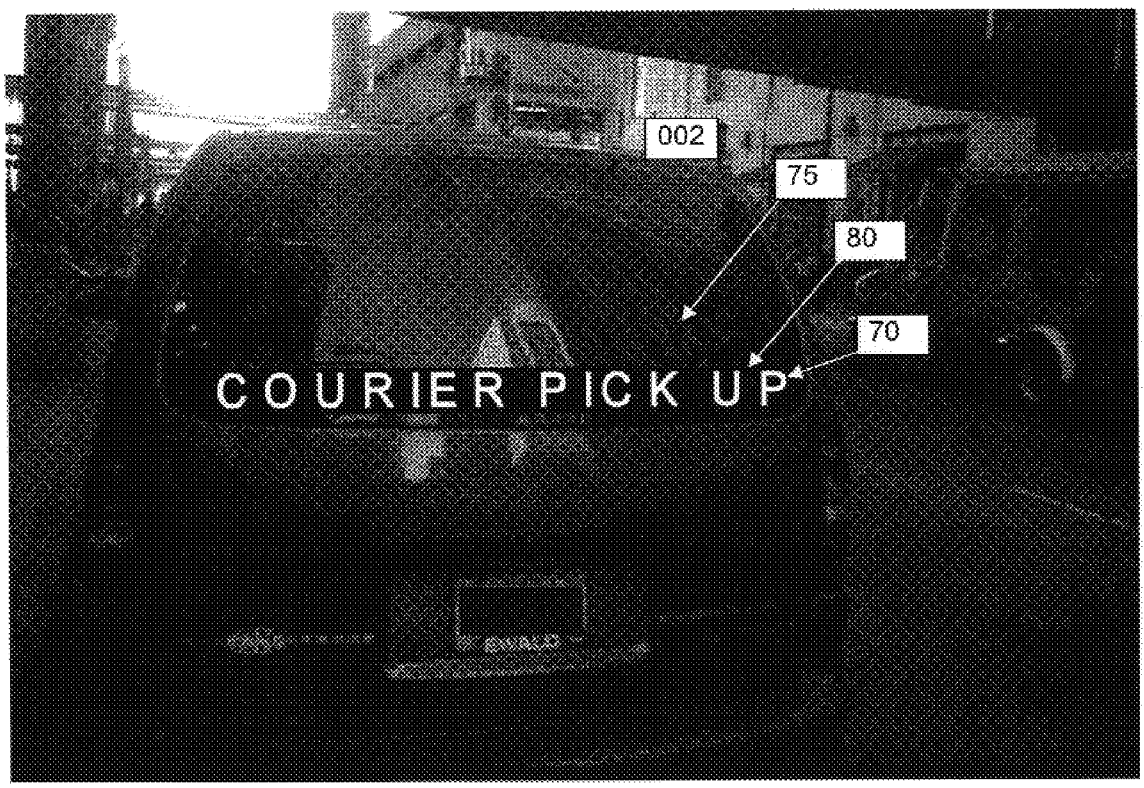
FIG. 5 represent a vehicle with an ADRWD Unit display in parallelism with the current invention arranged inside the rear window of the vehicle. The display is shown portraying the message "COURIER PICK UP".

FIG. 5 represent a vehicle with an ADRWD Unit display 80 in parallelism with the current invention arranged inside the rear window 75 of the vehicle 002. The display is shown portraying the message "COURIER PICK UP" 70. This picture represents the affects of the ADRWD-Unit Display's commercial value, as it pertains to notification to drivers approaching from the rear that it is a commercial vehicle parked in a no parking zone. Very useful for avoiding parking tickets from parking meter law enforcement.

Figure 6:
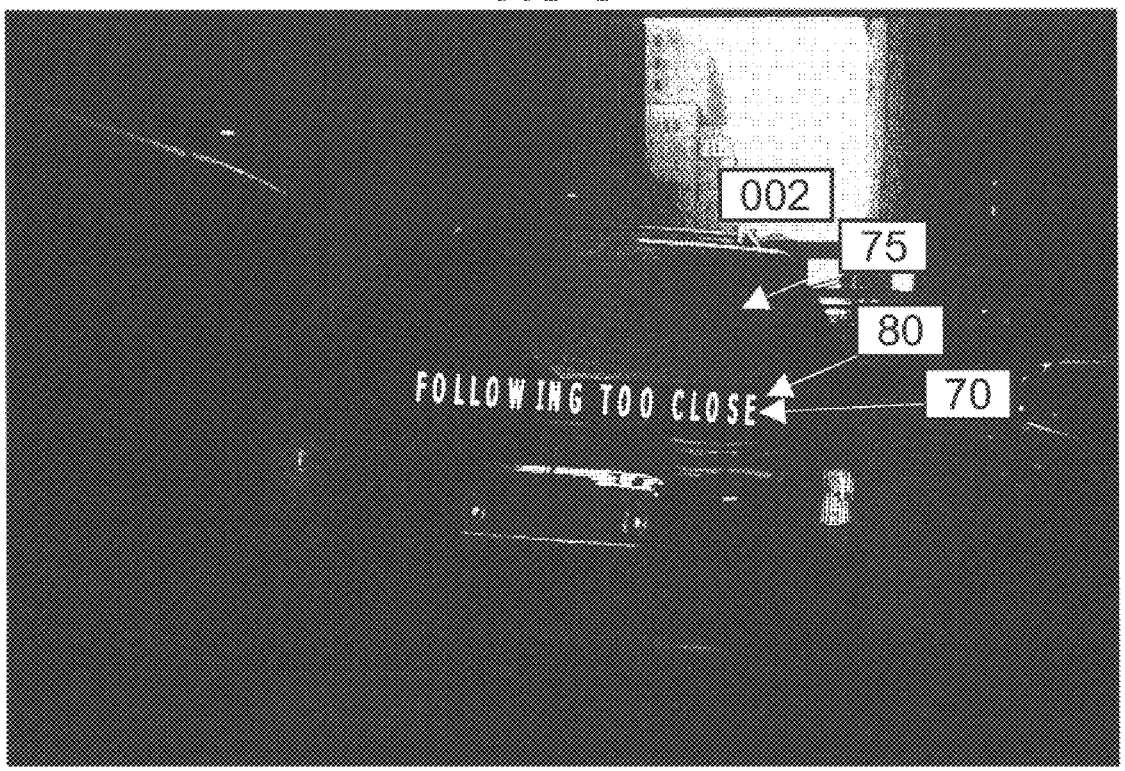
FIG. 6 represent a vehicle with an ADRWD Unit display in parallelism with the current invention arranged inside the rear window of the vehicle. The display is shown portraying the message "FOLLOWING TOO CLOSE".

FIG. 6 represent a vehicle with an ADRWD Unit display 80 in parallelism with the current invention arranged inside the rear window 75 of the vehicle 002. The display is shown portraying the message "FOLLOWING TOO CLOSE" 70. This illustration represents the affects of the ADRWD-Unit warning the driver behind that he/she is dangerously "FOLLOWING TOO CLOSE", and that the driver should slow down one, or two more car links, to avoid a rear end collision. Such messages are extremely useful for freeway, or interstate travel.

Figure 7:
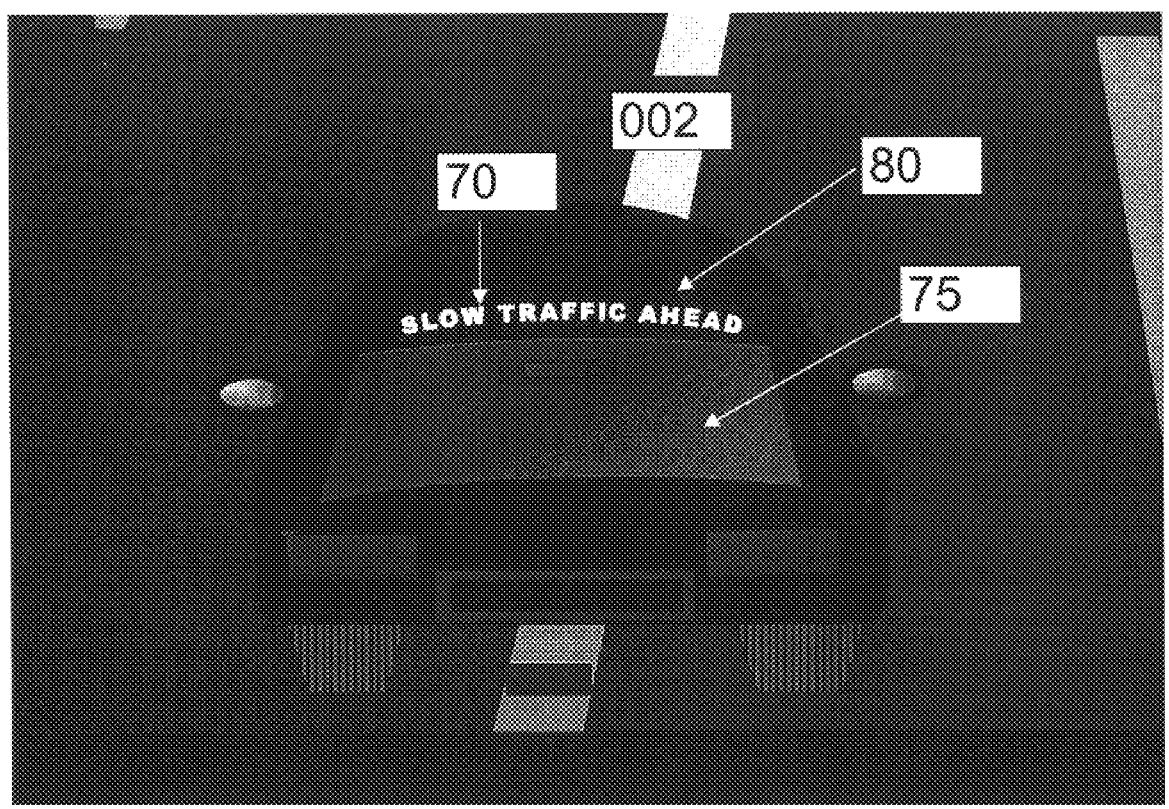
FIG. 7 represent a vehicle with an ADRWD Unit display in parallelism with the current invention arranged inside the rear window of the vehicle. The display is shown portraying the message "AND SLOW TRAFFIC AHEAD".

FIG. 7 represent a vehicle with an ADRWD Unit display 80 in parallelism with the current invention arranged inside the rear window 75 of the vehicle 002. The display is shown portraying the message "AND SLOW TRAFFIC AHEAD" 70. This illustration represents the affects the ADRWD-Unit Display, displays, and communicates to the driver in the rear that the driver needs to reduce speed, because of "SLOW TRAFFIC AHEAD". Extremely useful when driver is traveling at a high speed with other vehicles, and traffic is slowing down up ahead, and driver wishes to notify driver behind to prepare to slow down, or stop.

Figure 8:
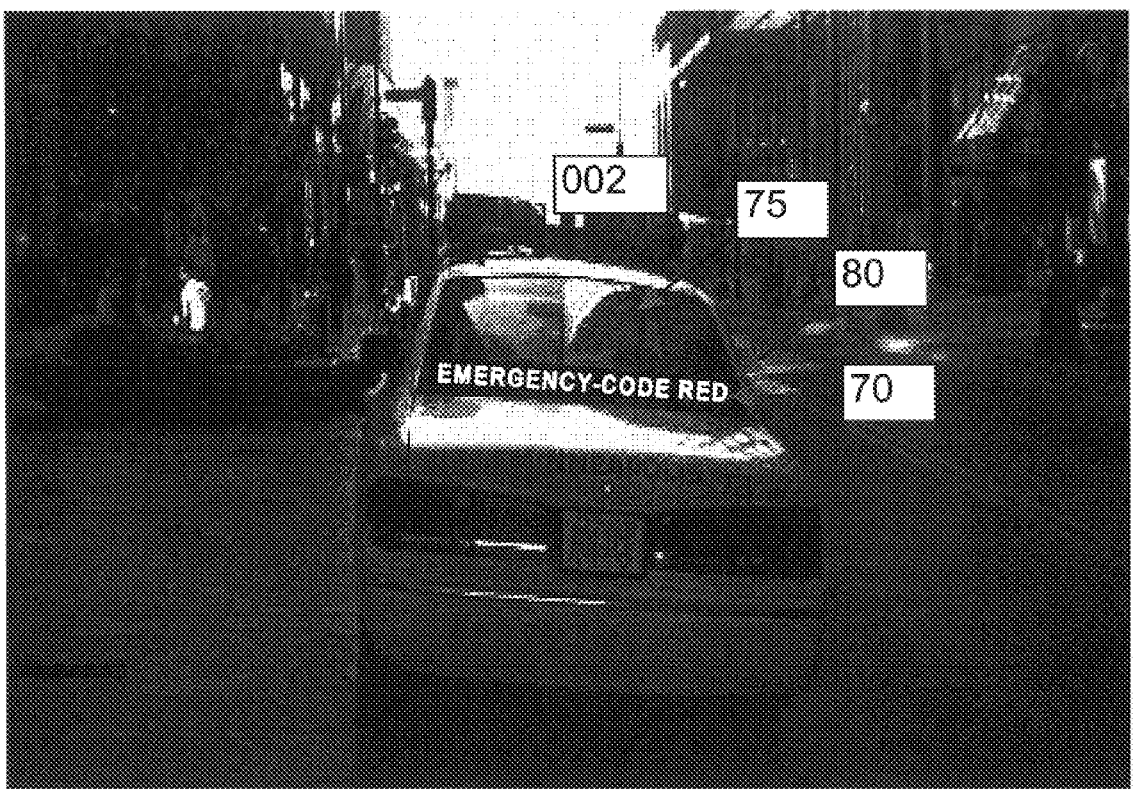
FIG. 8 represent a vehicle with an ADRWD Unit display in parallelism with the current invention arranged inside the rear window of the vehicle. The display is shown portraying the message "EMERGENCY-CODE RED".

FIG. 8 represent a vehicle with an ADRWD Unit display 80 in parallelism with the current invention arranged inside the rear window 75 of the vehicle 002. The display is shown portraying the message "EMERGENCY-CODE RED" 70. This schematic of the ADRWD-Unit illustrates a very small example pertaining to the value of the device in which it is applied for Government Law Enforcement usage, in addition to other Governmental vehicles.

Figure 9:
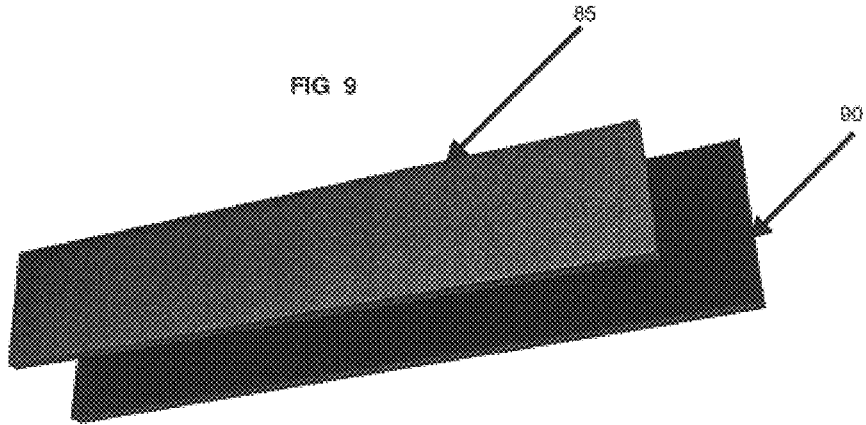
FIG. 9 depict how the ADRWD-Unit Display is assembled. The ADRWD-Unit Display, detached from the embodiment to illustrate how the ADRWD screen is shaped

FIG. 9 depicts how the ADRWD-Unit Display is assembled. The ADRWD-Unit Display 85, detached from the embodiment to illustrate how the ADRWD screen is shaped. The protective cashing 90 in which the ADRWD Unit LEP screen 85 is fitted is the section in which the components, and electronic electrical circuitry is contained. Again as stipulated the ADRWD Unit Display screen 85 can vary in shape, and size, pertaining to the shape, and specifications of the rear windshield of model vehicle.

Figure 10A:
FIGS. 10A–10C depict both the ADRWD Unit Display, and Protective Cashing intact as one embodiment. It also illustrates various messages seen from angles in which establish distinction.
Figure 10B:
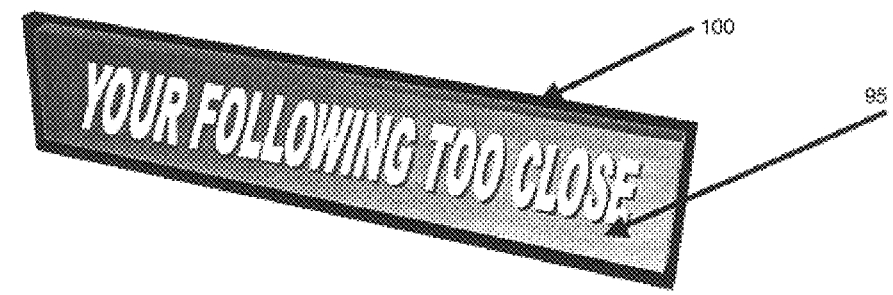
Figure 10C:

FIGS. 10A–10C depicts both the ADRWD Unit Display 95, and Protective Cashing 100 intact as one embodiment. It also illustrates various messages seen from an angle in which establishes distinction.

Figure 11:
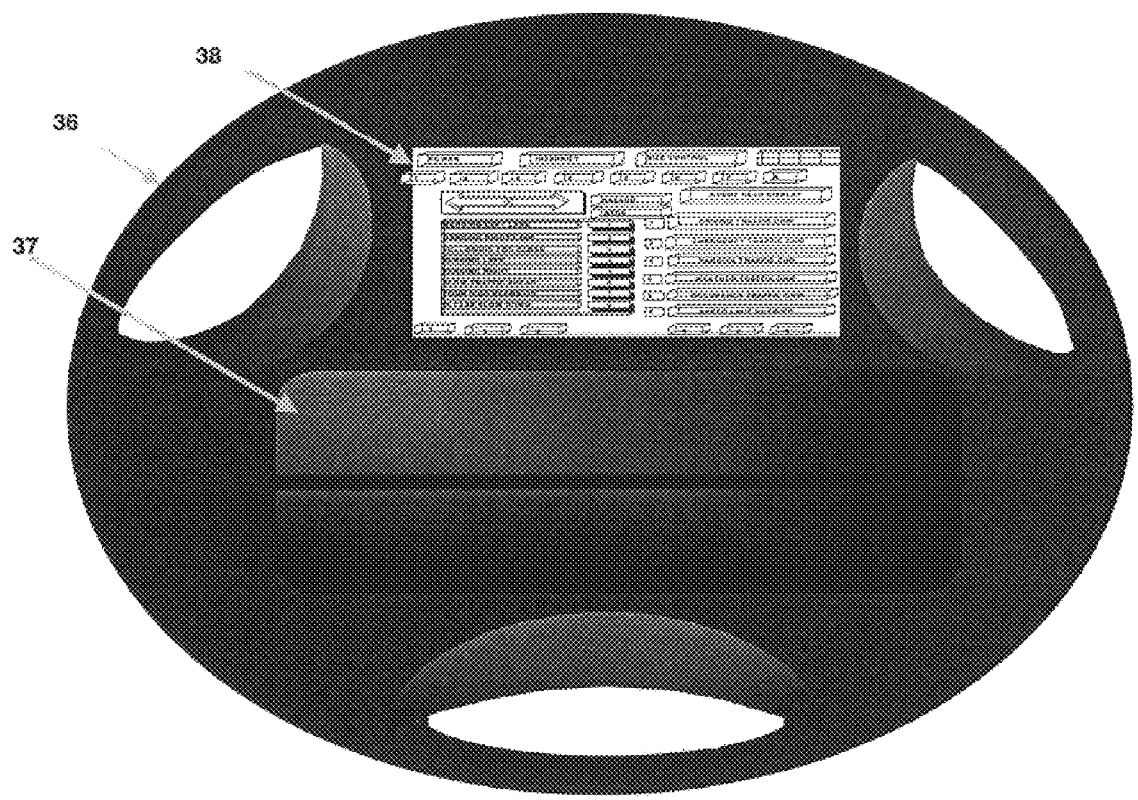
FIG. 11 Location of the ADRWD-Unit Control Pad within the compartment of the automobile. The most preferable option is to install it directly into the steering wheel.

FIG. 11 Location of the ADRWD-Unit Control Pad 38 within the compartment of the automobile consist of two logical options. One option is to install it into the dashboard. The most preferable option is to install it directly into the steering wheel 36. This option provides maximum performance when selecting commands. Notice on FIG. 11 that the ADRWD Unit computer module does not interfere with the airbag 37, or maneuverability of the steering wheel, but does provide convenience, and easy accessibility in selecting display commands. Note: The illustration does not represent the actual size of neither, the steering wheel 36, or ADRWD- Unit Control Pad 38. The actual size would be similar to standard steering wheel specifications now in circulation for specified automobile models.

Figure 12:
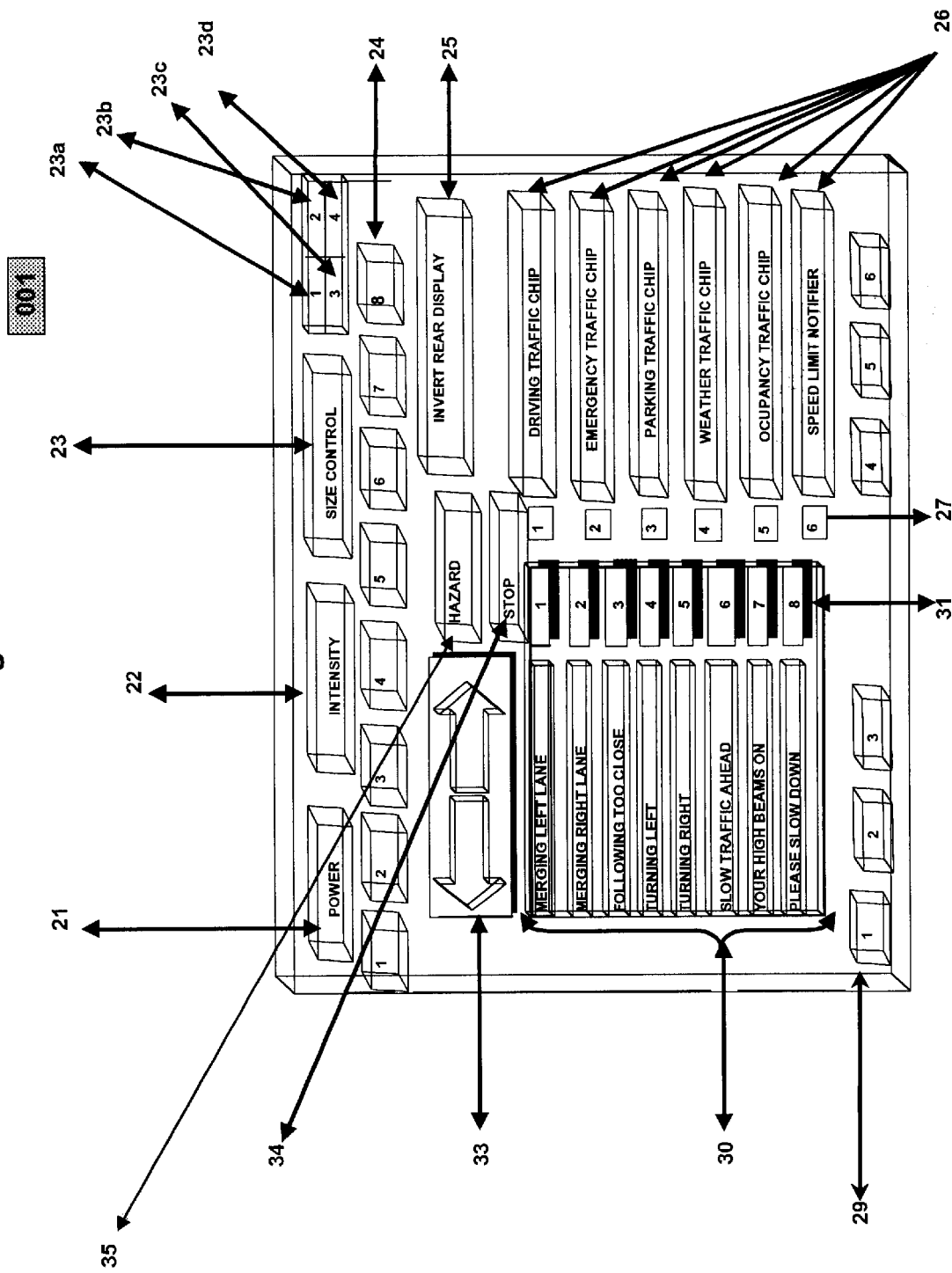
FIG. 12 show an Automotive Digital Rear Window Display Unit system comprising of a solid state microelectronic infrastructure computer unit.

FIG. 12 shows an Automotive Digital Rear Window Display Unit system 001 consisting of a solid state microelectronics infrastructure computer unit which is installed in a vehicle, wherein the Automotive Digital Rear Window Display Unit includes a power button 21 which turns the ADRWD power unit on, a light intensity button 22 which provides up to three levels of visual intensity, and depth, a size control button 23 which provides four different size effects, regular size 23a, medium size 23b, large size 23c, and extra large 23d, a set of selection function buttons 24 which user has the ability to select the type of display one desires, depending on the driving situation one is surrounded by, an invert rear display button 25 which changes the background red and the foreground black, or vise versa. The ADRWD Unit has a set of preprogrammed memory program insert chips 26 (hard drive) which translate preprogrammed digital information to the rear display 85, a activated program chip indicator 27 which allows user to distinguished which chip is currently in use, a set of program chip selection buttons 29 which selects the type of driving program user wishes activated, a digital LCD console mode selection indicator 30 which provides a list of what selections are available on the activated program insert chip, a activated selection highlight indicator function 31, two standard turning signal buttons 33 which displays an arrow if turning left, or right. A blinking hazard/beacon light button 35 which when pressed it sends a low level electrical current to the display, a stop function button 34 which stops all commands.

FIG. 13 A interface with Mfg.'s automotive microelectronic main computer 2008 having the capability to transmit, and interface with a electronic circuitry signal component processor 2009 from which current conventional lighting signals on automobiles are allocated certain degrees of singular sets of precedence over the ADRWD Unit commands.

A digital component system whereas display is relayed commands from a microelectronics computer 2007 through electronically component circuitry connections. ADRWD Unit comprises a microelectronic motherboard 2001 in which the other components are supported, including zero insertion force sockets (ZIP) and peripheral expansion slots. ADRWD Unit comprises a microelectronic processor 2000A. ADRWD Unit comprises a ROM caching 2002 and memory swapping wherein memory manager 2006A commands execute from faster memory. ADRWD Unit comprises a small computer system interface (SCSI-2) 2003 whereas SCSI-2 specification calls for the drive (program chips) 2000, not the host logistics, to have most of the intelligence when processing the data. ADRWD Unit comprises programmable accelerators called graphic coprocessors 2004, which are programmed to specific types of tasks. ADRWD Unit comprises a disk cache 2005 whereas the disk cache is a protected area in the control pad's RAM 2006 in which when the ADRWD Unit is fired up it requests data from the preprogrammed insert chips 2000 and creates a copy of that data and then placed in the disk cache 2005. ADRWD Unit comprises of a flat panel light emitting polymer display 2011 positioned on the inside of the compartment of a vehicle, in which display screen expands the full length of the windshield for optimum distinction, whereas display unit includes a micro processing component 2009 to acquire the correct priority command method from both the ADRWD computer, and the vehicle main micro computer 2008 whereas display includes a video digitizer 2010 to enhance display resolution at a scanning frequency from one corner of the display to the opposite corner, to a refresh rate of −0 to 75 hertz. ADRWD Unit 2007 uses electronic circuitry connections from the ADRWD microelectronic computer directly or via manufacturer's vehicle computer to the LEP flat panel display 2011.

If vehicle is a passenger car, then the ADRWD-Unit Display can be located on the bottom, or top of the rear windshield glass, depending on the model specifications of the windshield. If vehicle is a utility vehicle, then the ADRWD should be located on the top of the rear windshield glass, because most vehicles are shorter than utility vehicles, but again the position of display depends on the specifications of vehicle. The purpose of this, is not to impede rear view vision. The size of display is not generic because all model cars have different specifications pertaining to size of window. The Display is not limited to a particular shape or size, as illustrated.

What is claimed is:

1. An Automotive Digital Rear Window Display Unit system disposed in a vehicle, comprising of:

solid state microelectronics infrastructure computer unit which is installed in a vehicle, wherein the Automotive Digital Rear Window Display Unit (ADRWD) includes a power button which turns the power unit on, a light intensity button which provides up to three levels of visual intensity, and depth, a size control button which provides four different size effects, a set of selection friction buttons which user has the ability to select the type of display one desires, depending on the driving situation one is surrounded by, a invert rear display button, which changes the background red and the foreground black, a set of preprogrammed memory program insert chips which translate preprogrammed digital information to the rear display, a activated program chip indicator, which allows user to distinguished which chip is currently in use, a set of program chip selection buttons which selects the type of driving program user wishes activated, a digital mode selection indicator which provides a list of what selections are available on the activated program insert chip, a activated selection highlight indicator function, two standard turning signal buttons which displays an arrow if turning left, or right, a blinking hazard/beacon light button which when pressed it sends a low level electrical current to the display, a stop function button, which stops all commands;

a vehicle main micro computer having a transmittal electronic circuitry signal component processor from which current conventional lighting signals on automobiles are allocated certain degrees of singular sets of precedence over the ADDRD Unit commands;

a flat panel light emitting polymer display positioned on the inside of the compartment of a vehicle, in which display screen expands the full length of the windshield for optimum distinction, and visualization whereas display unit includes a micro processing component to acquire the correct priority command method from both the ADRWD computer, and the vehicle main micro computer, whereas display includes a video digitizer to enhance display resolution and a scanning frequency from one corner of the display to the opposite corner, to a refresh rate of −0 to 75 hertz.

2. A digital component system of claim whereas display is relayed commands from a microelectronics computer through electronically component circuitry connections.

3. A digital component system of claim 2, whereas a automotive main computer having a electronic circuitry signal component processor from which current conventional lighting signals on automobiles are allocated certain degrees of singular sets of precedence over the ADRWD Unit commands.

4. A digital component system of claim 3 whereas ADRWD Unit comprises a microelectronic motherboard in which the other components are supported, including zero insertion force sockets (ZIP) and peripheral expansion slots.

5. A digital component system of claim 4 whereas ADRWD Unit comprises a ROM caching and memory swapping wherein memory manager commands execute from faster memory.

6. A digital component system of claim 5 whereas ADRWD Unit comprises a small computer system interface (SCSI-2) whereas SCSI-2 specification calls for the drive, not the host logistics, to have most of the intelligence when processing the data, whereas ADRWD Unit comprises programmable accelerators called graphic coprocessors, which are programmed to specific types of tasks.

7. A digital component system of claim 6 whereas ADRWD Unit comprises a disk cache whereas the disk cache is a protected area in the control pad's RAM in which when the ADRWD Unit is fired up it requests data from the preprogrammed insert chips and creates a copy of that data and then places it in the disk cache.

8. A digital component system of claim 7 whereas ADRWD Unit comprises of a flat panel light emitting polymer (LEP) display positioned on the inside of the compartment of a vehicle, in which display screen expands the full length of the windshield for optimum distinction, whereas display unit includes a micro processing component to acquire the correct priority command method from both the ADRWD computer, and the vehicle main micro computer, whereas display includes a video digitizer to enhance display resolution at a scanning frequency from one corner of the display to the opposite corner, to a refresh rate of −0 to 75 hertz.

9. A digital component system of claim 8 whereas ADRWD Unit uses direct electronic circuitry connections, and components from the ADRWD microelectronic computer to the LEP flat panel display, and not radio frequencies.

10. A digital component system of claim 9 whereas ADRWD Unit comprising a RAM memory, and a memory manager component processor.

11. A digital component system of claim 10 whereas ADRWD Unit's functions, and design is the exclusive claim of inventor.

\* \* \* \* \*